United States Patent
Himmel et al.

(10) Patent No.: US 6,725,252 B1
(45) Date of Patent: Apr. 20, 2004

(54) METHOD AND APPARATUS FOR DETECTING AND PROCESSING MULTIPLE ADDITIONAL REQUESTS FROM A SINGLE USER AT A SERVER IN A DISTRIBUTED DATA PROCESSING SYSTEM

(75) Inventors: Maria Azua Himmel, Austin, TX (US); Michael Gerard Mall, Round Rock, TX (US); Steven Edward Rosengren, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/325,401

(22) Filed: Jun. 3, 1999

(51) Int. Cl.[7] ............................................. G06F 15/16
(52) U.S. Cl. ...................... 709/203; 709/217; 709/227
(58) Field of Search ................................. 709/203, 217, 709/227, 228; 715/500

(56) References Cited

U.S. PATENT DOCUMENTS

| | | | | |
|---|---|---|---|---|
| 6,061,741 A | * | 5/2000 | Murphy, Jr. et al. | 709/203 |
| 6,085,220 A | * | 7/2000 | Courts et al. | 709/105 |
| 6,105,064 A | * | 8/2000 | Davis et al. | 709/224 |
| 6,108,646 A | * | 8/2000 | Mohri et al. | 707/1 |
| 6,119,167 A | * | 9/2000 | Boyle et al. | 709/203 |
| 6,195,593 B1 | * | 2/2001 | Nguyen | 700/121 |
| 6,266,666 B1 | * | 7/2001 | Ireland et al. | 707/10 |
| 6,279,033 B1 | * | 8/2001 | Selvarajan et al. | 709/217 |
| 6,289,390 B1 | * | 9/2001 | Kavner | 709/200 |
| 6,323,881 B1 | * | 11/2001 | Broulik et al. | 345/733 |
| 6,338,089 B1 | * | 1/2002 | Quinlan | 709/203 |
| 6,401,223 B1 | * | 6/2002 | DePenning | 711/112 |

* cited by examiner

*Primary Examiner*—Mehmet B. Geckil
(74) *Attorney, Agent, or Firm*—Duke W. Yee; Diana L. Roberts; Stephen J. Walder, Jr.

(57) ABSTRACT

A method and apparatus in a distributed data processing system for processing requests for documents. A request is received from a user for a selected page at a server. The selected page is returned to the user with a unique token, wherein each user is sent a unique token. Responsive to receiving a new request for a page, a determination is made as to whether the new request includes the unique token. Responsive to receiving the new request including the unique token, a determination is made as to whether a previous request from this user is simultaneously being processed by the server. Responsive to a new request having been received for a document while another prior request is pending, the new request is processed by either rejecting the new request, or by canceling the previous request and processing the new request, or by delaying the processing of the new request until the previous request has completed.

43 Claims, 5 Drawing Sheets

METHOD AND APPARATUS FOR DETECTING AND PROCESSING MULTIPLE ADDITIONAL REQUESTS FROM A SINGLE USER AT A SERVER IN A DISTRIBUTED DATA PROCESSING SYSTEM

BACKGROUND OF THE INVENTION

1. Technical Field

The present invention relates generally to an improved data processing system and in particular to an improved method and apparatus for processing requests at a data processing system. Still more particularly, the present invention relates to a method and apparatus for processing multiple requests from a client at a server in a distributed data processing system.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). Information is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information to a data source or server, such as a data source identified by a URL at the client machine. Retrieval of information on the Web is generally accomplished with an HTML-compatible browser. The Internet also is widely used to transfer applications to users using browsers. With respect to commerce on the Web, individual consumers and business use the Web to purchase various goods and services. In offering goods and services, some companies offer goods and services solely on the Web while others use the Web to extend their reach.

Users exploring the Web have discovered that the content supported by HTML document format on the Web was too limited. Users desire an ability to access applications and programs, but applications were targeted towards specific types of platforms. As a result, not everyone could access applications or programs. This deficiency has been minimized though the introduction and use of programs known as "applets", which may be embedded as objects in HTML documents on the Web. Applets are Java programs that may be transparently downloaded into a browser supporting Java along with HTML pages in which they appear. These Java programs are network and platform independent. Applets run the same way regardless of where they originate or what data processing system onto which they are loaded.

Java™ is an object oriented programming language and environment focusing on defining data as objects and the methods that may be applied to those objects. Java supports only a single inheritance, meaning that each class can inherit from only one other class at any given time. Java also allows for the creation of totally abstract classes known as interfaces, which allow the defining of methods that may be shared with several classes without regard for how other classes are handling the methods. Java provides a mechanism to distribute software and extends the capabilities of a Web browser because programmers can write an applet once and the applet can be run on any Java enabled machine on the Web.

Servers today, in particular HTTP web servers, will process any request the server receives on a HTTP socket. A user, by using the stop and reload browser controls, can cause multiple requests to be sent to the web server before the web server has completed the processing of previously sent requests. The web server processing of a request may require large amounts of cpu time or memory. The simultaneous processing of multiple requests of this type for a single user may degrade web server responsiveness for other users of the web server or in extreme situations cause the web server to fail because it ran out of memory.

Therefore, it would be advantageous to have an improved method and apparatus for detecting and processing multiple requests from a single user.

SUMMARY OF THE INVENTION

The present invention provides a method and apparatus in a distributed data processing system for processing requests for documents. A request is received from a user for a selected page at a server. The selected page is returned to the user with a unique token, wherein each user is sent a unique token. Responsive to receiving a new request for a page, a determination is made as to whether the new request includes the unique token. Responsive to receiving the new request including the unique token, a determination is made as to whether a previous request from this user is simultaneously being processed by the server. Responsive to a new request having been received for a document while another prior request is pending, the new request is processed by either rejecting the new request, or by canceling the previous request and processing the new request, or by delaying the processing of the new request until the previous request has completed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
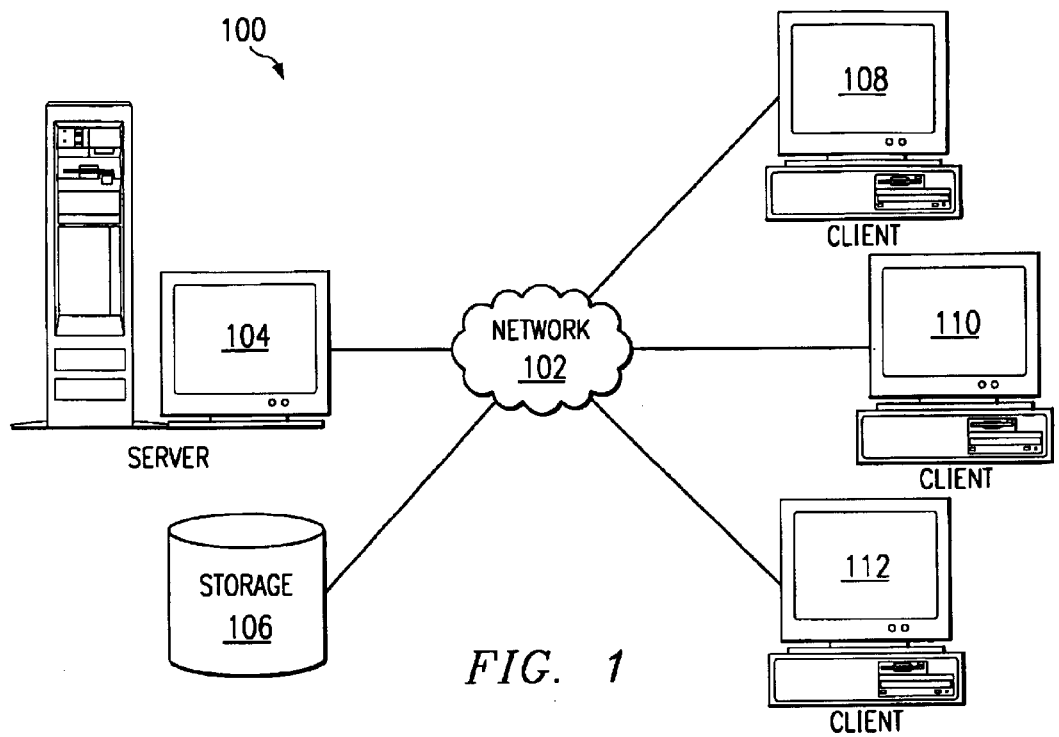
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to a network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
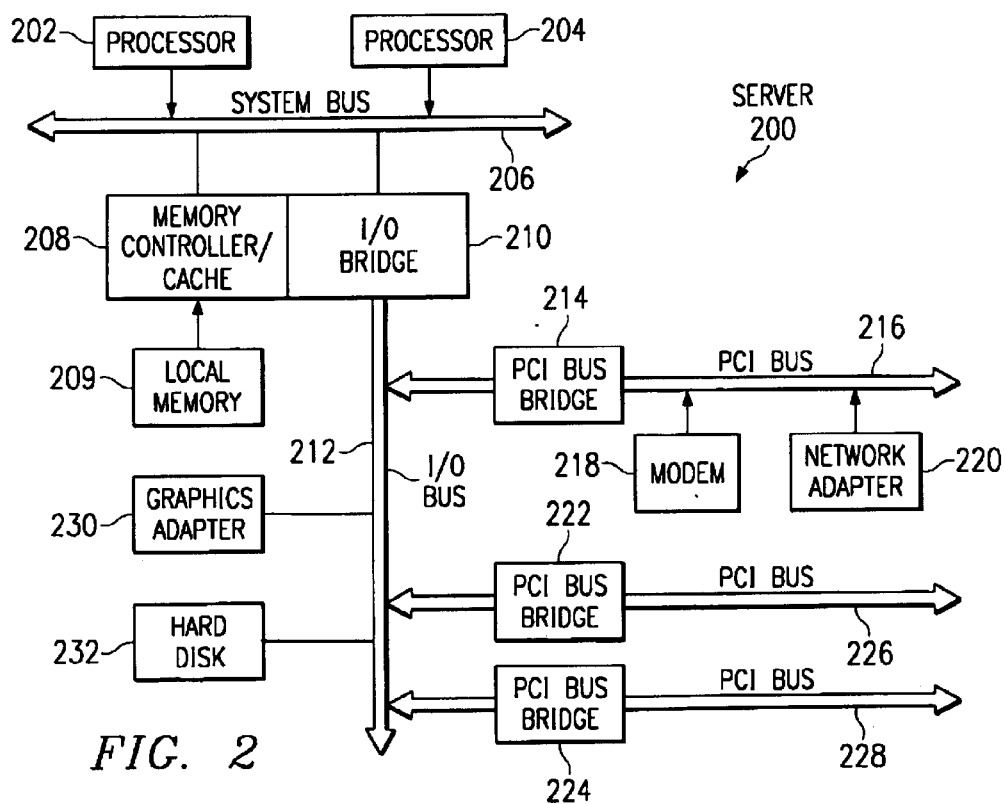
FIG. 2 is a block diagram depicting a data processing system that may be implemented as a server, in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
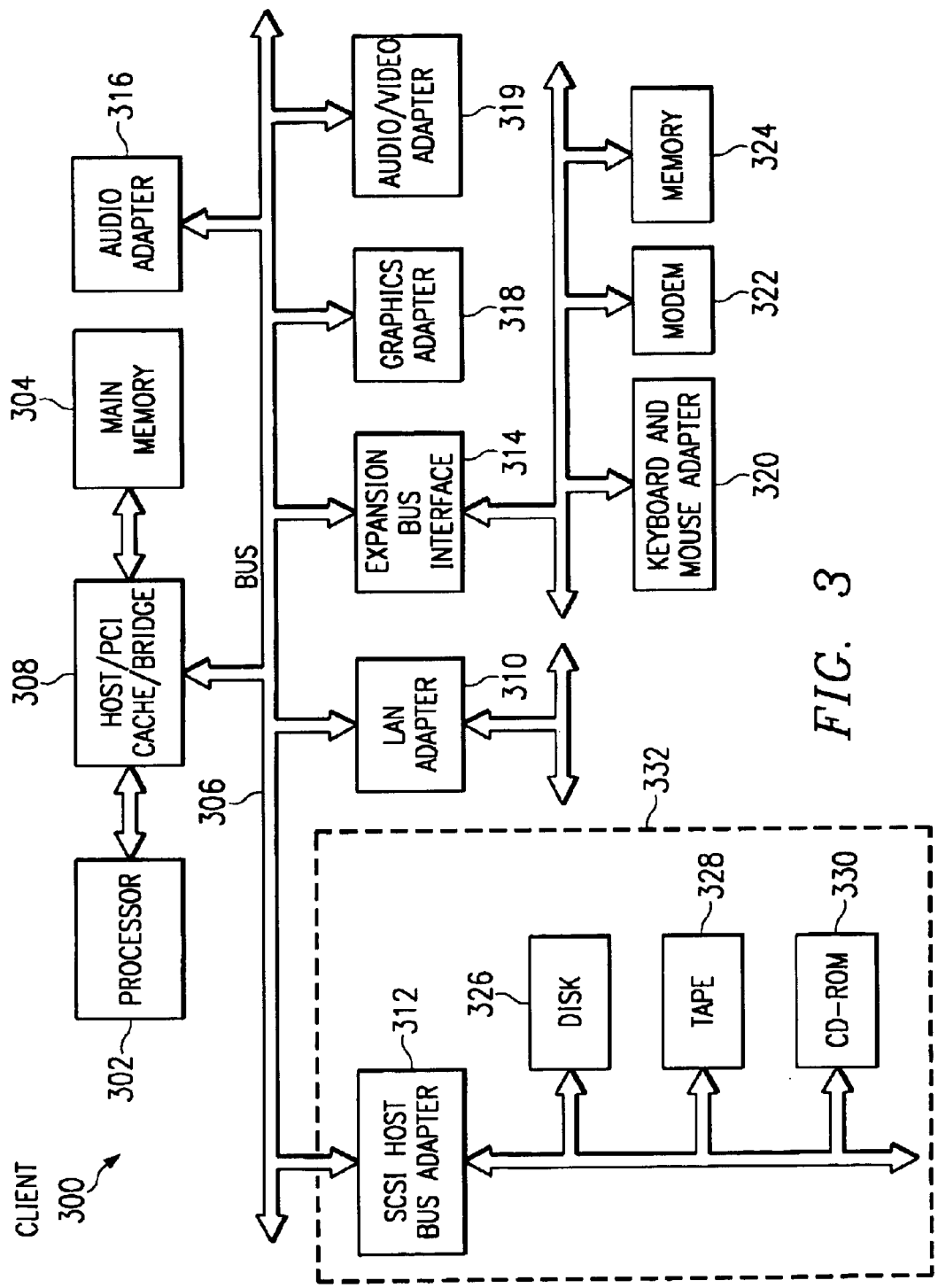
FIG. 3 is a block diagram illustrating a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide nonvolatile memory for storing operating system files and/or user-generated data.

The depicted example in FIG. 3 and above-described examples are not meant to imply architectural limitations.

The present invention provides a method, apparatus, and instructions for processing multiple requests from a user at a server. The present invention employs a mechanism that involves a seamless page identification method that enables a server to identify multiple requests by the same user and only process the appropriate request. A unique identifier, such as a token, a cookie, a certificate, or a hidden field is created by the server for the client. This unique identifier is attached or sent with a page to the user. When the unique identifier is in the form of a token, the token may be attached to the page on a HTTP header. Each time a request is received from the client, the unique identifier is returned to the server. This unique identifier allows the server to identify if the server is still processing previous requests made by the user.

In this manner, the server may selectively process the request. The server may reject the new request and continue processing the previous request. Alternatively, the server may cancel or kill the previous request and process the new request in place of the previous request. Another alternative involves the server continuing to process the previous request and delaying processing of the new request until the previous request has been processed.

These processes may be applied to processing not only additional requests for the same page, but identifying whether the user has made additional requests to the server for different pages. An additional request is a second or later request that is received by the server that is still processing a prior request for the user.

Figure 4A:
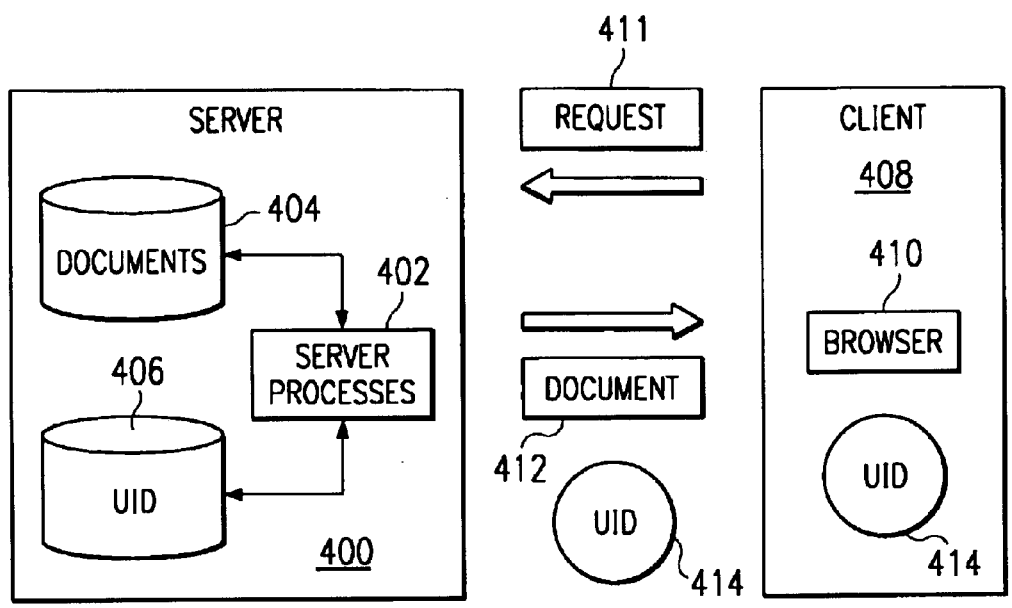
FIGS. 4A–4B are diagrams illustrating a process for handling multiple requests from a user at a client depicted in accordance with a preferred embodiment of the present invention.
Figure 4B:
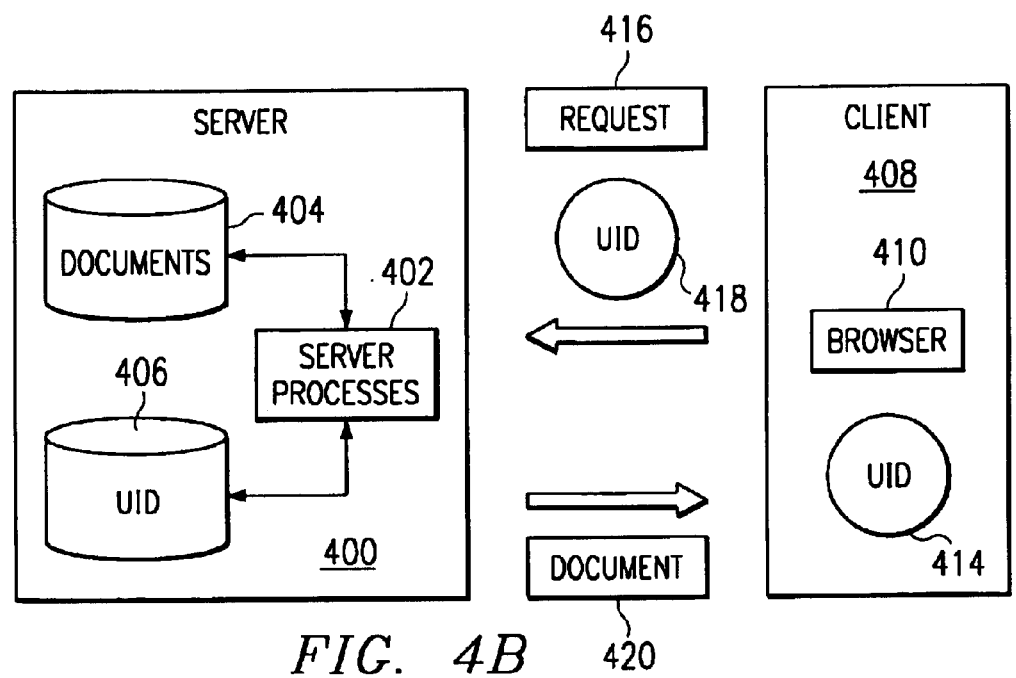

With reference now to FIGS. 4A–4B, a diagram illustrating a process for handling multiple requests from a user at a client is depicted in accordance with a preferred embodiment of the present invention. In FIG. 4A, server 400 includes server processes 402. The server processes are processes used to allow a client to access various documents stored in document database 404. The server processes includes the mechanism need for a user to gain access to server 400 as well as the process used to search for and return documents to the user. Server 400 also includes a unique identifier (UID) database 406. Unique identifiers in unique identifier database 406 are used by server processes 402 to determine whether additional requests for a document or page have been made by a user. The unique identifiers may be, for example, a number, a time stamp, or a user identification and a number. These unique identifiers may be sent in various forms, such as, for example, a token, a cookie, a certificate, and a hidden field.

In this example, client 408 uses a browser 410 to search for and access documents in document database 404 in server 400. As used herein, a browser is a program or application that is able to search for documents on a network, such as the Internet or an Intranet. These documents may be, for example, web pages, text files, or images. In FIG. 4A, the user at client 408 sends a request 410 to server 400. Request 410 is received by server processes 402, which determines whether the request contains a unique identifier. If the request does not contain a unique identifier, server processes 402 in server 400 in this example will return a default page from document database 404 along with a unique identifier created for the particular user. In the depicted examples, the default page may be, for example, a log in page or a welcome page. The return of a default page is optional. Alternatively, the page requested by the user may be returned to the user along with the unique identifier. This unique identifier is stored within unique identifier database 406. As a result, document 412 is returned to unique identifier 414 to client 408 with the document being displayed to the user on browser 410. Unique identifier 414 is stored within client 408.

In FIG. 4B, when the user at client 408 makes another request for a document from server 400, a request 416 is sent to server 400 in which request 416 includes or has unique identifier 418 attached to it. In these examples, browser 410 is configured to return a unique identifier with a request if a unique identifier is present for the server, such as server 400.

Server processes 402 receives request 416 with unique identifier 418 and determines whether an additional request has been made by the user client 408 for a document located at server 400. An additional request is a second or later request that is received by the server that is still processing a prior request for the user. If an additional request has been made, server processes 402 will selectively process the pending request. This determination of whether a additional request has been made is accomplished by querying unique identifier database 406. In this example, database 406 includes indications of unique identifiers for which requests are being serviced. If no other requests for this particular identifier are being processed by server processes 402, then an indication is set in unique identifier database 406 to indicate that a request is in process. This indication may take various forms, such as a flag or other type of indicators associated with the unique identifier and unique identifier database 406.

If other requests for this particular identifier are being processed by the server processes 402, then server processes 402 will selectively process only one of the requests in this example. Depending on the implementation, server processes 402 will continue to process the currently pending request and reject the new request. In this case, server processes 402 will send a message back to client 408 that the user already has a pending request in process on the server and must wait for the pending request to be completed before another request from the user will be processed. Alternatively, server processes 402 may terminate processing of the pending request and process the new request.

As a result, document 420 is returned to the user at client 408. This user ID may take a number of forms, such as a unique number, a time stamp, a user ID and password, or other combination. A time stamp or some other unique number may be used if the user at the client has not logged on to the server or the server does not provide such a mechanism.

Figure 5:
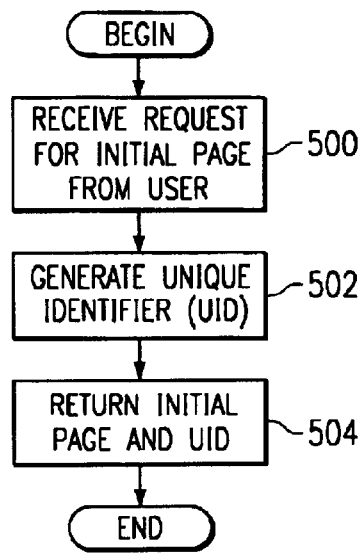
FIG. 5 is a flowchart of a process for handling a request in which a unique identifier (UID) is absent depicted in accordance with a preferred embodiment of the present invention.

With reference now to FIG. 5, a flowchart of a process for handling a request in which a unique identifier (UID) is absent is depicted in accordance with a preferred embodiment of the present invention. The process begins by receiving a request for an initial page from a user at a client (step 500). Thereafter, a unique identifier is generated (step 502). The unique identifier may include an identification of the server depending on the implementation. This unique identifier is returned to the client along with the initial page (step 504) with the process terminating thereafter.

Figure 6:
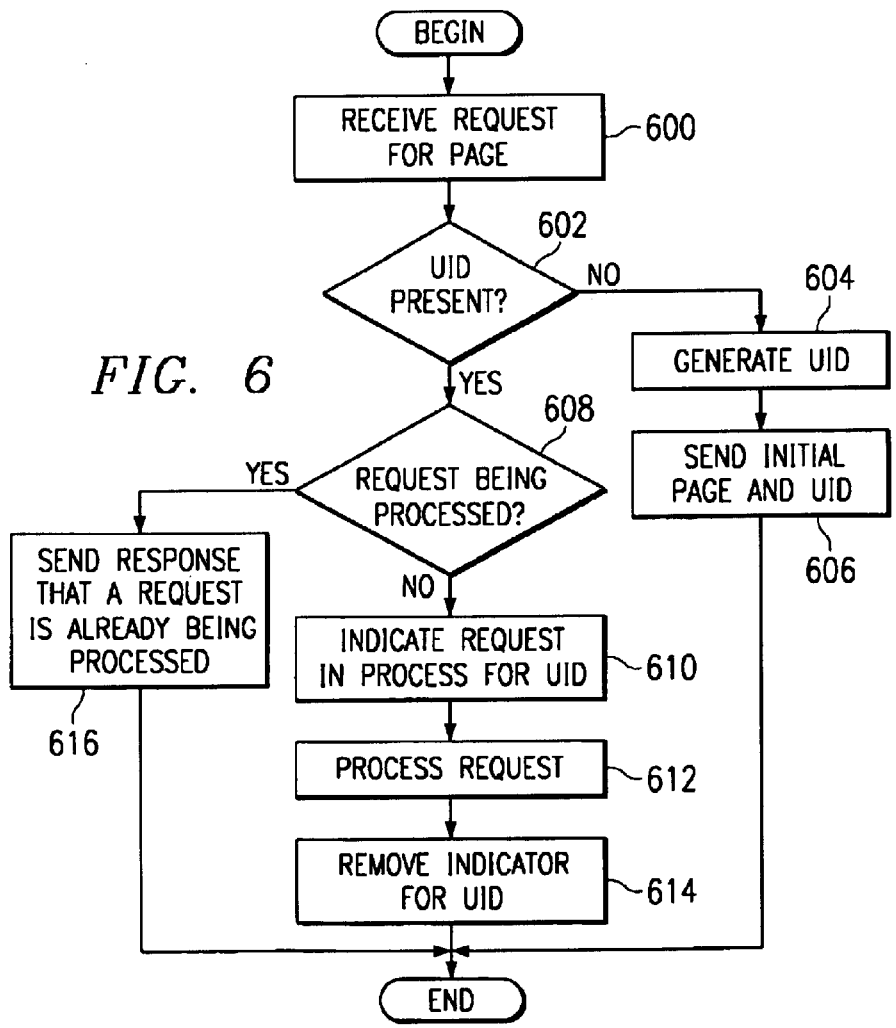
FIG. 6 is a flowchart of a process for handling requests depicted in accordance with a preferred embodiment of the present invention.

With reference now to FIG. 6, a flowchart of a process for handling requests is depicted in accordance with a preferred embodiment of the present invention. This process is used when the initial page at a web site is not being accessed. The process begins by receiving a request for a page (step 600). Upon receiving a request, a determination is made as to whether a unique identifier is present in the request (step 602). If the unique identifier is not present, a unique identifier is generated (step 604), and an initial page with the unique identifier are sent to the user (step 606) with the process terminating thereafter.

With reference again to step 602, if a unique identifier is present in the request from the client, then a determination is made as to whether a previous request from this user is being processed. (step 608). If a request is not being processed then an indication is made in a database or other data structure to indicate that a request is in process for the unique identifier (step 610). Next, the request is processed (step 612). A request that is being processed or waiting for processing is referred to as a "pending" request. Upon finishing processing of the request, then the indicator is removed for the unique identifier associated with the request (step 614) with the process terminating thereafter.

With reference again to step 608, if a request is currently being processed, then a response is sent that a request is currently being processed for the particular user (step 616) with the process terminating thereafter. This response is returned to the client to indicate to the user that a request is currently being processed.

Figure 7:
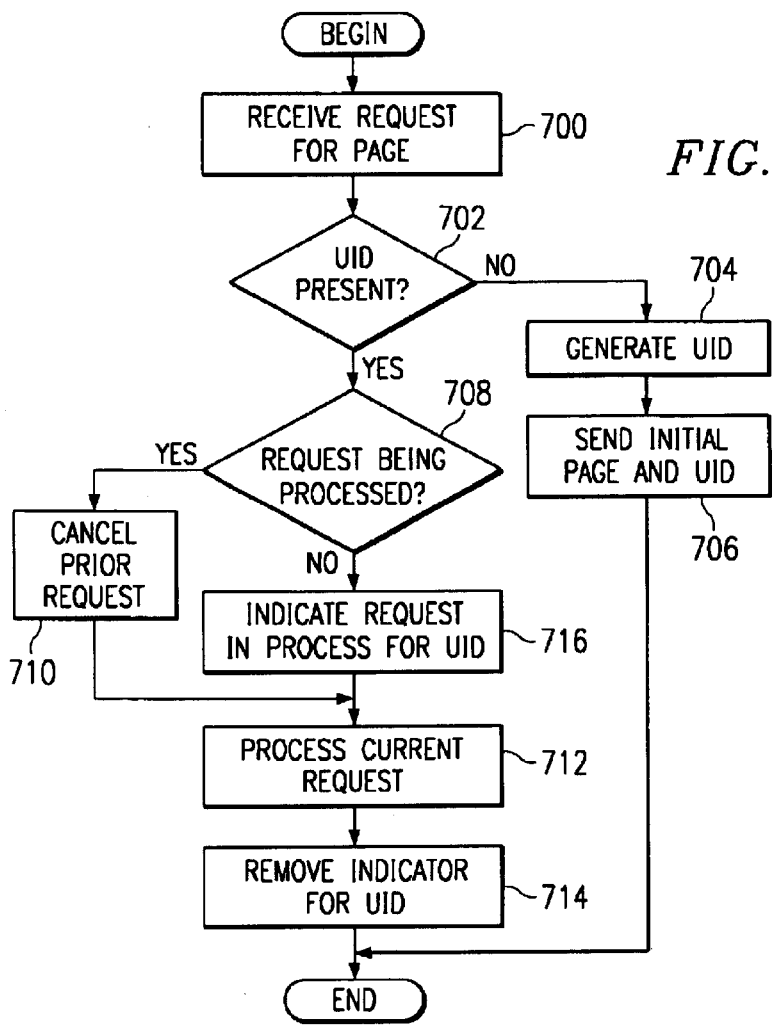
FIG. 7 is a flowchart of a process for handling requests depicted in accordance with a preferred embodiment of the present invention.

With reference now to FIG. 7, a flowchart of a process for handling requests is depicted in accordance with a preferred embodiment of the present invention. This process differs from the process illustrated in FIG. 6 in that the new request is handled and the pending request is terminated.

The process begins by receiving a request for a page (step 700). This request is referred to as a new request or a current request. A determination is then made as to whether a unique identifier is present in the request (step 702). If a unique identifier is not present, then a unique identifier is generated (step 704), and an initial page and the unique identifier are sent back to the user at the client (step 706) with the process terminating thereafter.

With reference again to step 702, if a unique identifier is present, then a determination is made as to whether a request is currently being processed (step 708). If a request is currently being processed, then the prior request or pending request is canceled (step 710). Then, the current request is processed (step 712).

Next, the indicator for the unique identifier is removed (step 714) with the process terminating thereafter. The indicator is removed or unassociated with the unique identifier when the processing of the request has completed.

With reference again to step 708, if a request is not being processed, then an indication is made that a request is in process for the unique identifier (step 716) with the process then proceeding to step 712 as described above.

If the server is to delay processing of the new request until the prior request has been processed, step 710 will wait for the prior request to complete before continuing to process the current request in step 712. The indication made in step 610 in FIG. 6 or step 716 in FIG. 7 is used to indicate that a request is being processed for a particular user. This indication may be made by associating an indicator and the page with the unique identifier. In this manner, a determination may be made as to whether a request for the same page or document as been received from a particular user.

Alternatively, the processes of the present invention also may be applied to processing requests generally for any documents rather then just whether a request is being processed for the same documents or page. In this manner, the processes may be used to reduce the number of requests from a particular user. In such a case, an indicator is associated with the unique identifier generally without any indication of page. Thus, if the user makes more than one request, the new request may be rejected until the current request has been processed. Alternatively, the new request may be processed with the pending request terminated.

Figure 8:
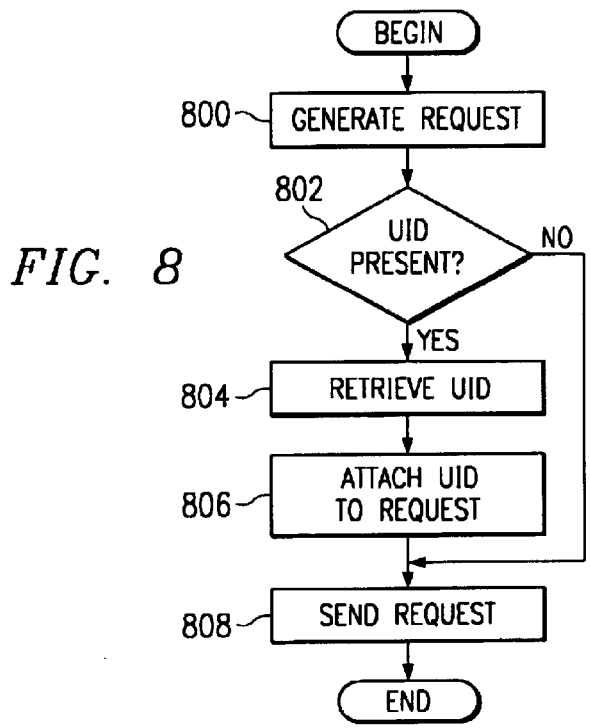
FIG. 8 is a flowchart of a process for generating a request at a client depicted in accordance with a preferred embodiment of the present invention.

With reference now to FIG. 8, a flowchart of a process for generating a request at a client is depicted in accordance with a preferred embodiment of the present invention. The process begins by generating a request (step 800). Thereafter, a determination is made as to whether a unique identifier is present for the particular server to which the request is to be sent (step 802). If a unique identifier is present, then the unique identifier is retrieved (step 804). The unique identifier is then attached or inserted into the request (step 806). The request is then sent to the server (step 808) with the process terminating thereafter.

With reference again to step 802, if a unique identifier is not present, the process then proceeds to step 808 to send the request without the unique identifier.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. Although the depicted examples were directed towards processes used in a HTTP server, the processes of the present invention may be applied to other types of servers and data processing systems. For example, the processes of the present invention may be applied to other protocols in which users have the ability to initiate requests without being prevented/blocked from submitting new requests. Further, in the depicted examples, an initial page is sent to the user along with a unique identifier when a request is received in which a unique identifier is absent. Alternatively, the server may continue to process requests without unique identifiers. The embodiment was chosen and described in order to best explain the principles of the invention, the practical application, and to enable others of ordinary skill in the art to understand the invention for various embodiments with various modifications as are suited to the particular use contemplated

What is claimed is:

1. A method in a distributed data processing system for processing requests for documents, the method comprising the data processing system, implemented steps of:
   responsive to receiving a request from a client for a document, determining whether a prior request for the document is being processed; and
   responsive to a determination that a prior request for the document is being processed, canceling the request and processing the prior request.

2. The method of claim 1, further comprising:
   responsive to a determination that the prior request for the document is being processed, sending a message to the client indicating that the prior request is being processed and that additional requests will be unprocessed until processing of the prior request has completed.

3. The method of claim 1, wherein the document is a web page.

4. The method of claim 1, wherein the step of determining whether a prior request for the document is being processed comprises determining whether a unique identifier is associated with the request and whether a prior request associated with the unique identifier is being processed.

5. A method in a distributed data processing system for processing requests for documents, the method comprising the data processing system implemented steps of:
   receiving a request via hypertext transfer protocol from a client for a selected page at a server;
   returning the selected page to the client with a unique token, wherein each client is sent a unique token;
   responsive to receiving a current request for the page, determining whether the current request includes the unique token;
   responsive to receiving the current request including the unique token, determining whether a pending request is present for the document; and
   responsive to a pending request being present for the document, canceling the current request and processing only the pending request.

6. The method of claim 5, wherein the page is a web page.

7. A method in a data processing system for processing requests for documents, the method comprising the data processing system implemented steps of:
   receiving a current request from a user;
   determining whether the current request includes a unique identifier;
   responsive to the current request including the unique identifier, determining whether a previous request from the user is being processed based on the unique identifier; and
   responsive to a determination that a previous request from the user is being processed, canceling of the current request.

8. The method of claim 7 further comprising:
   sending a message to the user, wherein the message indicates that a request is already being processed by the server and that the request must be processed before new requests can be accepted from the user.

9. The method of claim 7 further comprising:
   responsive to a unique identifier being absent from the current request, sending a unique identifier to the user for use in future requests to the server.

10. The method of claim 7, wherein the step of receiving a current request comprises:
    receiving a current request for a document from a user.

11. The method of claim 10, wherein the step, responsive to the current request including the unique identifier, determining whether a previous request from the user is being processed based on the unique identifier comprises:
    responsive to the current request including the unique identifier, determining whether a previous request for the document from the user is being processed based on the unique identifier.

12. The method of claim 7, wherein the unique identifier is a token.

13. The method of claim 7, wherein the unique identifier is located in a cookie.

14. The method of claim 7, wherein the unique identifier is located in a certificate.

15. The method of claim 7, wherein the unique identifier is located in a hidden field.

16. A method in a data processing system for processing requests for documents, the method comprising the data processing system implemented steps of:
    receiving a current request for a web page from a user,
    determining whether the current request includes a unique identifier;
    responsive to the current request including the unique identifier, determining whether a previous request from the user is being processed based on the unique identifier; and
    responsive to a determination that a previous request from the user is being processed, canceling the current request.

17. The method of claim 16, wherein the previous request is for a first web page and wherein the current request is for a second web page.

18. A distributed data processing system comprising:
    a network; a plurality of clients connected to the network, wherein the plurality of clients generate requests for documents; and a server connected to the network, wherein the server has a number of modes of operation including:
  a first mode of operation in which the server monitors for a request for a document;
  a second mode of operation, responsive to receiving a request as a current request, in which the server determines whether the current request for the document includes a unique identifier;
  a third mode of operation, responsive to the current request for the document including the unique identifier, in which the server determines whether a pending request from the client is being processed based on the unique identifier; and
  a fourth mode of operation, responsive to a determination that a pending request from the client is being processed, in which the server cancels the current request.

19. The method of claim 18, wherein the pending request is for the document.

20. The method of claim 18, wherein the pending request is for another document.

21. The distributed data processing system of claim 18, wherein the distributed data processing system is an Internet.

22. The distributed data processing system of claim 18, wherein the distributed data processing system is an intranet.

23. A data processing system for processing requests for documents, the data processing system comprising:
  determining means, responsive to receiving a request from a client for a document, for determining whether a prior request for the document is being processed; and
  selective means, responsive to a determination that a prior request for the document is being processed, for canceling the request.

24. The data processing system of claim 23, further comprising:
  sending means for sending a message to the client indicating that a prior request is being processed and that additional requests will be unprocessed until processing of the prior request has completed.

25. The data processing system of claim 23, wherein the document is a web page.

26. The data processing system of claim 23, wherein the means of determining whether a prior request for the document is being processed comprises determining whether a unique identifier is associated with the request and whether a prior request associated with the unique identifier is being processed.

27. A data processing system for processing requests for documents, the data processing system comprising:
  receiving means for receiving via hypertext transfer protocol a request from a client for a selected page at a server;
  returning means for returning the selected page to the client with a unique token, wherein each client is sent a unique token;
  first determining means, responsive to receiving a current request for the page, for determining whether the current request includes the unique token;
  second determining means, responsive to receiving the current request including the unique token, for determining whether a pending request is present for the document; and
  processing means, responsive to a pending request being present for the document, for canceling the current request and processing only the pending request.

28. The data processing system of claim 27, wherein the page is a web page.

29. A data processing system for processing requests for documents, the data processing system comprising:
  receiving means for receiving a current request for a web page from a client;
  first determining means for determining whether the current request includes a unique identifier;
  second determining means, responsive to the current request including the unique identifier, for determining whether a previous request from the client is being processed based on the unique identifier; and
  processing means, responsive to a determination that a previous request from the client is being processed, for canceling the current request.

30. The data processing system of claim 29 further comprising:
  sending means for sending a message to the client, wherein the message indicates that a request is already being processed by the server and that the request must be processed before new requests can be accepted.

31. The data processing system of claim 29 further comprising:
  sending means, responsive to a unique identifier being absent from the current request, for sending a unique identifier to the client for use in future requests to the server.

32. The data processing system of claim 29, wherein the step of receiving a current request comprises:
  receiving means for receiving a current request for a document from a client.

33. The data processing system of claim 32, wherein the means, responsive to the current request including the unique identifier, determining whether a previous request from the client is being processed based on the unique identifier comprises:
  determining means, responsive to the current request including the unique identifier, for determining whether a previous request for the document from the client is being processed based on the unique identifier.

34. The data processing system of claim 29, wherein the unique identifier is a token.

35. The data processing system of claim 29, wherein the unique identifier is located in a cookie.

36. The data processing system of claim 29, wherein the unique identifier is located in a certificate.

37. The data processing system of claim 29, wherein the unique identifier is located in a hidden field.

38. A data processing system for processing requests for documents, the data processing system comprising:
  receiving means for receiving a current request for a web page from a user;
  first determining means for determining whether the current request includes a unique identifier;
  second determining means, responsive to the current request including the unique identifier, for determining whether a previous request from the user is being processed based on the unique identifier; and
  processing means, responsive to a determination that a previous request from the user is being processed, for canceling the current request.

39. The data processing system of claim 38, wherein the previous request is for a first web page and wherein the current request is for a second web page.

40. A computer program product in a computer readable medium for processing requests for documents, the computer program comprising:

first instructions for receiving via hypertext protocol a request from a client for a selected page at a server;

second instructions for returning the selected page to the client with a unique token, wherein each client is sent a unique token;

third instructions, responsive to receiving a current request for the page, for determining whether the current request includes the unique token;

fourth instructions, responsive to receiving the current request including the unique token, for determining whether a pending request is present for the document; and fifth instructions, responsive to a pending request being present for the document, for canceling the current request and processing only the pending request.

41. A computer program product in a computer readable medium for processing requests for documents, the computer program product comprising:

first instructions for receiving a current request for a web page from a user;

second instructions for determining whether the current request includes a unique identifier;

third instructions, responsive to the current request including the unique identifier, for determining whether a previous request from the user is being processed based on the unique identifier; and fourth instructions, responsive to a determination that a previous request from the user is being processed, for canceling the current request.

42. A computer program product in a computer readable medium for processing requests for documents, the computer program product comprising:

first instructions for receiving a current request from a user;

second instructions for determining whether the current request includes a unique identifier;

third instructions, responsive to the current request including the unique identifier, for determining whether a previous request from the user is being processed based on the unique identifier; and fourth instructions, responsive to a determination that a previous request from the user is being processed, for canceling one of the current request.

43. A computer program product in a computer readable medium for processing requests for documents, the computer program product comprising:

first instructions, responsive to receiving a request from a client for a document, for determining whether a prior request for the document is being processed; and second instructions, responsive to a determination that a prior request for the document is being processed, for canceling the request.

* * * * *

UNITED STATES PATENT AND TRADEMARK OFFICE
CERTIFICATE OF CORRECTION

PATENT NO.    : 6,725,252 B1
DATED         : April 20, 2004
INVENTOR(S)   : Himmel et al.

It is certified that error appears in the above-identified patent and that said Letters Patent is hereby corrected as shown below:

Column 6,
Line 37, after "request" delete "410" and insert -- 411 --.
Line 38, after "Request" delete "410" and insert -- 411 --.

Column 9,
Line 36, after "system" delete "," (comma).

Column 10,
Line 16, after "cancelling" delete "of".

Column 11,
Line 18, after "19. The" delete "method" and insert -- distributed data processing system --.
Line 20, after "20. The" delete "method" and insert -- distributed data processing system --.

Column 14,
Line 17, after "canceling" delete "one of".

Signed and Sealed this

Eighth Day of November, 2005

JON W. DUDAS
*Director of the United States Patent and Trademark Office*